United States Patent
Yoshimura et al.

(10) Patent No.: US 9,437,891 B2
(45) Date of Patent: Sep. 6, 2016

(54) HYDROGEN GENERATOR AND FUEL CELL SYSTEM

(71) Applicant: Panasonic Intellectual Property Management Co., Ltd., Osaka (JP)

(72) Inventors: Akihisa Yoshimura, Shiga (JP); Koichi Kusumura, Osaka (JP); Hirofumi Kokubu, Shiga (JP); Yoshio Tamura, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/389,952

(22) PCT Filed: Apr. 19, 2013

(86) PCT No.: PCT/JP2013/002648
§ 371 (c)(1),
(2) Date: Oct. 1, 2014

(87) PCT Pub. No.: WO2013/157274
PCT Pub. Date: Oct. 24, 2013

(65) Prior Publication Data
US 2015/0072253 A1    Mar. 12, 2015

(30) Foreign Application Priority Data

Apr. 19, 2012  (JP) .................................. 2012-095680

(51) Int. Cl.
*H01M 8/06* (2016.01)
*C01B 3/32* (2006.01)
(Continued)

(52) U.S. Cl.
CPC .............. *H01M 8/0675* (2013.01); *C01B 3/32* (2013.01); *C01B 3/38* (2013.01); *H01M 8/04156* (2013.01);
(Continued)

(58) Field of Classification Search
CPC ......... H01M 8/0618; H01M 8/04156; H01M 8/0675; C01B 3/32; C01B 2203/0205; C01B 2203/0244; C01B 2203/025; C01B 2203/0283; C01B 2203/044; C01B 2203/0445; C01B 2203/047; C01B 2203/127; C01B 2203/148; C01B 3/38; B01J 2219/24
See application file for complete search history.

(56) References Cited

U.S. PATENT DOCUMENTS 5,686,196 A    11/1997  Singh et al.
2003/0012993 A1  1/2003  Katagiri et al.
(Continued)

FOREIGN PATENT DOCUMENTS

JP    2003-017109 A    1/2003
JP    2004-060729 A    2/2004
(Continued)

OTHER PUBLICATIONS

International Search Report issued in PCT/JP2013/002648, dated Jul. 30, 2013, with English translation.
(Continued)

*Primary Examiner* — Muhammad Siddiquee
(74) *Attorney, Agent, or Firm* — McDermott Will & Emery LLP

(57) ABSTRACT

A hydrogen generator comprises a reformer configured to generate a hydrogen-containing gas through a reforming reaction using a raw material; a hydrodesulfurization unit configured to remove a sulfur compound from the raw material; a recycle passage configured to flow therethrough the hydrogen-containing gas to be added to the raw material in a state before the raw material flows into the hydrodesulfurization unit, the recycle passage having a downward slope; and a water drain passage configured to discharge condensed water generated in the downward slope of the recycle passage.

11 Claims, 10 Drawing Sheets

(51) Int. Cl.
*H01M 8/04* (2016.01)
*C01B 3/38* (2006.01)

(52) U.S. Cl.
CPC ......... *H01M 8/0618* (2013.01); *B01J 2219/24* (2013.01); *C01B 2203/0205* (2013.01); *C01B 2203/025* (2013.01); *C01B 2203/0244* (2013.01); *C01B 2203/0283* (2013.01); *C01B 2203/044* (2013.01); *C01B 2203/047* (2013.01); *C01B 2203/0445* (2013.01); *C01B 2203/127* (2013.01); *C01B 2203/148* (2013.01); *Y02E 60/50* (2013.01)

(56) References Cited

U.S. PATENT DOCUMENTS

| | | | | |
|---|---|---|---|---|
| 2008/0026939 | A1* | 1/2008 | Gangwal | B01D 53/02 502/414 |
| 2008/0161428 | A1* | 7/2008 | Strait | C01B 3/586 518/702 |
| 2010/0297513 | A1* | 11/2010 | Yasuda | H01M 8/04029 429/423 |
| 2011/0039957 | A1* | 2/2011 | Onishi | B01J 8/0035 518/728 |
| 2012/0040256 | A1 | 2/2012 | Kani et al. | |
| 2013/0164645 | A1* | 6/2013 | Takaichi | H01M 8/04261 429/432 |
| 2013/0252125 | A1* | 9/2013 | Shiosaki | H01M 8/04223 429/429 |

FOREIGN PATENT DOCUMENTS

| | | |
|---|---|---|
| JP | 2005-206414 A | 8/2005 |
| JP | 2006-104003 A | 4/2006 |
| JP | 2006-213566 A | 8/2006 |
| JP | 2008-251447 A | 10/2008 |
| JP | 2009-043527 A | 2/2009 |
| JP | 2011-113918 A | 6/2011 |
| WO | 2009/142611 A1 | 11/2009 |

OTHER PUBLICATIONS

Extended European Search Report issued in European Application No. 13778085.4, dated Apr. 22, 2015.

* cited by examiner

HYDROGEN GENERATOR AND FUEL CELL SYSTEM

RELATED APPLICATIONS

This application is the U.S. National Phase under 35 U.S.C. §371 of International Application No. PCT/JP2013/002648, filed on Apr. 19, 2013, which in turn claims the benefit of Japanese Application No. 2012-095680, filed on Apr. 19, 2012, the disclosures of which Applications are incorporated by reference herein.

TECHNICAL FIELD

The present invention relates to a hydrogen generator, and a fuel cell system. More specifically, the present invention relates to a hydrogen generator including a hydrodesulfurization unit, and a fuel cell system.

BACKGROUND ART

A fuel cell system typically includes a hydrogen generator including a reformer for generating a hydrogen-containing gas from a natural gas or LPG which is general raw material infrastructure.

By the way, a raw material gas such as a city gas contains a sulfur compound. As a removing method of the sulfur compound, there is a method of removing the sulfur compound by hydrodesulfurization using a recycled hydrogen-containing gas.

The recycled hydrogen-containing gas contains a plenty of steam. The steam may be condensed into water within a recycle line, and the recycle line may get clogged with the condensed water. To avoid this, there is proposed a fuel cell system, including a steam condensation/separation means provided on the recycle line to condense and separate the steam (e.g., see Patent Literature 1).

In this fuel cell system, the steam condensation/separation means includes, for example, a water-cooling condenser and a gas-liquid separator to prevent the steam from being condensed in a line which is downstream of the steam condensation/separation means.

CITATION LIST

Patent Literature

Patent Literature 1: Japanese Laid-Open Patent Application Publication No. 2003-017109

SUMMARY OF INVENTION

Technical Problem

In the above described conventional fuel cell system, the water-cooling condenser condenses the steam in the hydrogen-containing gas flowing through the recycle line, to prevent the steam from being condensed in the line which is downstream of the steam condensation/separation means. This is unfavorable in terms of achievement of a simpler device configuration or cost reduction.

The present invention is directed to solving the problem associated with the conventional example, and an object is to provide a hydrogen generator and a fuel cell system which are simpler in configuration and lower in cost than in the conventional example.

Solution to Problem

According to an aspect of the present invention, a hydrogen generator comprises a reformer configured to generate a hydrogen-containing gas through a reforming reaction using a raw material; a hydrodesulfurization unit configured to remove a sulfur compound from the raw material; a recycle passage configured to flow therethrough the hydrogen-containing gas to be added to the raw material in a state before the raw material flows into the hydrodesulfurization unit, the recycle passage having a downward slope; and a water drain passage configured to discharge condensed water generated in the downward slope of the recycle passage.

According to an aspect of the present invention, a fuel cell system comprises the above described hydrogen generator; and a fuel cell configured to generate electric power using the hydrogen-containing gas supplied from the hydrogen generator.

Advantageous Effects of Invention

According to an aspect of the present invention, it becomes possible to provide a hydrogen generator and a fuel cell system which are simpler in configuration and lower in cost than in a conventional example.

DESCRIPTION OF EMBODIMENTS

The inventors intensively studied to reduce a possibility that a recycled passage gets clogged with condensed water without a need to provide a condenser, in a hydrogen generator including a hydrodesulfurization unit, and a fuel cell system. As a result of the study, the inventors found out the followings.

The hydrogen-containing gas radiates heat while it is flowing through the recycle passage. Therefore, the condensed water is generated from the hydrogen-containing gas. This follows that the condensed water can be generated without a need to provide the condenser, by utilizing a heat radiation action in the recycle passage. By providing a water drain passage in the recycle passage, the condensed water can be discharged from the recycle passage. Based on this assumption, for example, at least a part of the recycle passage is formed to be inclined with respect to a horizontal plane (plane perpendicular to a vertical direction) to have a slope, and the water drain passage is provided in this slope. This makes it possible to efficiently discharge the condensed water generated within the recycle passage.

Alternatively, for example, a horizontally extending portion may be provided in the downstream end of the downward slope of the recycle passage, and the water drain passage may be provided in the horizontally extending portion.

By configuring the recycle passage such that the recycle passage is inclined downward to have the downward slope along a gas flow, a gas flow direction and the direction in which the condensed water moves downward conform to each other. This makes it possible to more efficiently discharge the condensed water from the recycle passage.

Embodiment 1

A hydrogen generator according to Embodiment 1 comprises a reformer configured to generate a hydrogen-containing gas through a reforming reaction using a raw material, a hydrodesulfurization unit configured to remove a sulfur compound from the raw material; a recycle passage configured to flow therethrough the hydrogen-containing gas to be added to the raw material in a state before the raw material flows into the hydrodesulfurization unit, the recycle passage having a downward slope, and a water drain passage configured to discharge condensed water generated in the downward slope of the recycle passage.

In this configuration, without providing a condenser separately, the condensed water can be generated in the recycle passage and the condensed water can be discharged through the water drain passage. This makes it possible to provide a hydrogen generator which is simpler in configuration and lower in cost than in a conventional example.

The term "the recycle passage having a downward slope" includes a case where at least a part of the recycle passage is formed to have a downward slope.

[Device Configuration]

Figure 1:
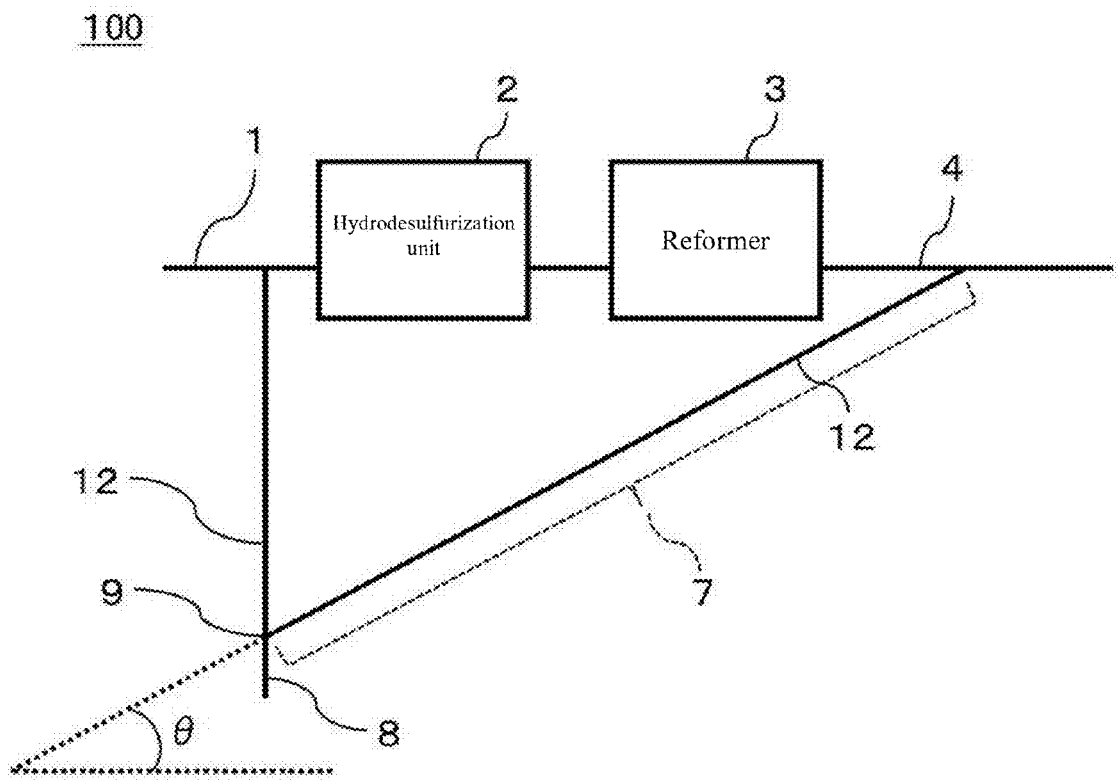
FIG. 1 is a view showing the exemplary schematic configuration of a hydrogen generator according to Embodiment 1.

FIG. 1 is a view showing the exemplary schematic configuration of a hydrogen generator according to Embodiment 1.

In the example of FIG. 1, a hydrogen generator 100 of the present embodiment includes a raw material supply passage 1, a hydrodesulfurization unit 2, a reformer 3, a recycle passage 12, and a water drain passage 8.

The raw material supply passage 1 is a passage through which a raw material to be supplied to the hydrodesulfurization unit 2 flows. The raw material supply passage 1 connects, for example, a raw material supply source (not shown) and the hydrodesulfurization unit 2 to each other.

The hydrodesulfurization unit 2 removes a sulfur compound from the raw material. More specifically, the hydrodesulfurization unit 2 removes the sulfur compound from the raw material to be supplied to the reformer 3.

The sulfur compound may be artificially added to the raw material as an odor component, or may be a natural sulfur compound originating in the raw material. Specific examples of the sulfur compound are tertiary-butylmercaptan (TBM), dimethyl sulfide (DMS), tetrahydrothiophene (THT), carbonyl sulfide (COS), hydrogen sulfide, etc.

The hydrodesulfurization unit 2 may be configured such that, for example, a hydrodesulfurization agent is filled into a container. As the hydrodesulfurization agent, for example, a CuZn based catalyst having a function of converting the sulfur compound into hydrogen sulfide, and a function of adsorbing hydrogen sulfide, is used. The hydrodesulfurization agent is not limited to the present example. For example, the hydrodesulfurization agent may include a CoMo based catalyst which converts the sulfur compound in the raw material into hydrogen sulfide, and at least one of a ZnO based catalyst and a CuZn based catalyst which are adsorbents which adsorb hydrogen sulfide resulting from the conversion.

The reformer 3 generates the hydrogen-containing gas through a reforming reaction using the raw material.

The raw material is a material containing, for example, an organic compound including at least carbon and hydrogen as constituent elements. Specific examples of the raw material are hydrocarbons such as a natural gas, a city gas, LPG, and LNG, and alcohol such as methanol and ethanol. The city gas refers to a gas supplied from a gas company to homes, and others via pipes.

The reforming reaction may be chosen as desired. Examples of the reforming reaction are a steam reforming reaction, an autothermal reaction, a partial oxidation reaction, etc.

Although not shown in FIG. 1, devices required in each reforming reaction are suitably provided. For example, in a case where the reforming reaction is the steam reforming reaction, the hydrogen generator 100 may be provided with a combustor (not shown) for heating the reformer 3, an evaporator (not shown) for generating a steam, and a water supply unit (not shown) for supplying water to the evaporator. In a case where the reforming reaction is the autothermal reaction, the hydrogen generator 100 may be provided with an air supply unit (not shown) for supplying air to the reformer 3, in addition to the above devices.

A CO reducing unit for reducing carbon monoxide in the hydrogen-containing gas generated in the reformer 3 may be provided at a location which is downstream of the reformer 3. The CO reducing unit may include, for example, at least one of a shift converter for reducing carbon monoxide through a shift reaction, and a CO removing unit for reducing carbon monoxide through at least one of an oxidation reaction and a methanation reaction.

A hydrogen-containing gas passage 4 is a passage through which the hydrogen-containing gas discharged from the reformer 3 flows.

The recycle passage 12 is a passage which is configured to flow therethrough the hydrogen-containing gas to be added to the raw material in a state before the raw material flows into the hydrodesulfurization unit, and which is formed to have a downward slope 7. Specifically, for example, as shown in FIG. 1, the upstream end of the recycle passage 12 is connected to the hydrogen-containing gas passage 4, while the downstream end of the recycle passage 12 is connected to the raw material supply passage 1.

The upstream end of the recycle passage 12 may not be necessarily connected to the hydrogen-containing gas passage 4. Instead, the recycle passage 12 may be directly connected to the reformer 3. In a case where the CO reducing unit is provided, the upstream end of the recycle passage 12 may be directly connected to the CO reducing unit, or may be provided on the hydrogen-containing gas passage 4 at a location which is downstream of the CO reducing unit. In a case where the CO reducing unit includes the shift converter and the CO removing unit, the upstream end of the recycle passage 12 may be connected to a passage between the shift converter and the CO reducing unit. The upstream end of the recycle passage 12 may be connected to a passage of an exhaust gas containing hydrogen, which gas is discharged from a hydrogen utilization device (e.g., fuel cell).

In addition, the downstream end of the recycle passage 12 may not be necessarily connected to the raw material supply passage 1. Instead, the recycle passage 12 may be directly connected to the hydrodesulfurization unit 2.

Although in the example of FIG. 1, the downward slope 7 is formed in a part of the recycle passage 12, the entire recycle passage 12 may be formed to have a downward slope. In this case, for example, a raw material inlet of the hydrodesulfurization unit 2 is positioned below a hydrogen-containing gas outlet of the reformer 3 in a vertical direction.

In other words, it is sufficient that at least a part of the recycle passage 12 has the downward slope 7. A part or entire of the downward slope 7 may be a part of a U-shaped pipe.

The recycle passage 12 is formed as, for example, a pipe. The recycle passage 12 may comprise, for example, metal such as stainless steel. The recycle passage 12 may be provided with at least one of an on-off valve and a flow (rate) control valve which are not shown.

The inclination θ formed between the downward slope 7 of the recycle passage 12 and the horizontal plane may be set to, for example, not less than 5 degrees and not more than 90 degrees. The inclination θ formed between the downward slope 7 and the horizontal plane is desirably set to not less than 10 degrees and not more than 90 degrees. The inclination θ formed between the downward slope 7 and the horizontal plane is desirably set to not less than 15 degrees and not more than 90 degrees. By setting an appropriate slope angle, the condensed water easily moves downward within the recycle passage 12 such that the condensed water does not get stagnant therein.

The downward slope 7 is configured such that the flow direction of the hydrogen-containing gas and the direction in which water droplets generated by condensation within the passage move downward, conform to each other. Since it is expected that the gas pushes and moves the water droplets, the water droplets are allowed to move downward even when the inclination angle of the downward slope 7 is less than the sliding angle of the water droplets in a stationary state.

As the inclination θ decreases in magnitude, the sliding speed of the water droplets decreases. When the sliding speed of the water droplets is low, the water droplets generated by condensation on the inner surface of the pipe may be joined together and grown into larger ones. By forming the larger water droplets, it becomes possible to suppress the water droplets generated in the downward slope 7 from moving to a downstream side of the recycle passage 12 due to a recycle gas, beyond a branch point at which the water drain passage 8 branches from downward slope 7, and to smoothly guide the water droplets to the water drain passage 8. To achieve similar effects, other means such as a baffle plate for causing the water droplets to move downward may be placed at the branch point at which the water drain passage 8 branches from the downward slope 7.

The water drain passage 8 discharges water condensed in the downward slope 7 of the recycle passage 12.

In the example of FIG. 1, in the recycle passage 12, the water drain passage 8 branches from the downstream end portion of the downward slope 7. In this configuration, the condensed water generated in the recycle passage 12 can be discharged efficiently. The location of the water drain passage 8 is not limited to the example of FIG. 1. The water drain passage 8 may be provided at any location on the recycle passage 12 having the downward slope. For example, the water drain passage 8 may branch from the intermediate portion of the downward slope 7. The downstream end of the water drain passage 8 may be connected to, for example, a condensed water tank which stores the condensed water. The downstream end of the water drain passage 8 may be connected to, for example, a drain channel outside the hydrogen generator 100.

The water drain passage 8 may be provided in a portion of the recycle passage 12 which portion extends horizontally from the downstream end portion of the downward slope 7. For example, in a case where the recycle passage 12 includes a horizontally extending portion, the water drain passage 8 may be provided in the horizontally extending portion. In other words, the water drain passage 8 may be provided in at least either one of the downward slope 7 of the recycle passage 12 and a portion of the recycle passage 12 which portion is downstream of the downward slope 7.

In the hydrogen generator 100 of the above example, the hydrogen-containing gas which has just been discharged from the reformer 3 is in a high-temperature state (e.g., 600 degrees C.) and contains a plenty of steam. When the hydrogen-containing gas in this state flows within the recycle passage 12, the hydrogen-containing gas radiates heat and its temperature is lowered, so that the condensed water as liquid water is generated.

The condensed water generated in the downward slope 7 of the recycle passage 12 moves downward through the downward slope 7 and then is discharged via the water drain passage 8. Since the downward slope 7 is inclined downward along the gas flow and hence the gas flow direction and the direction in which the condensed water moves downward conform to each other, the condensed water can be discharged from the recycle passage 12 more efficiently. Therefore, it becomes possible to reduce a possibility that the recycle passage 12 gets clogged with the condensed water with a simpler configuration and lower cost than in a conventional hydrogen generator provided with a condenser. The recycle passage 12 may be or may not be provided with the condenser. In a case where the recycle passage 12 is provided with the condenser, it becomes possible to suppress the recycle passage 12 from getting clogged with the condensed water, using a condenser which is smaller in size and simpler in configuration than in the condenser of the conventional hydrogen generator, because the condensed water is generated in the recycle passage 12 configured as described above.

If the inclination θ formed between the downward slope 7 of the recycle passage 12 and the horizontal plane is less than 90 degrees, the following advantages can be achieved, for example. The water condensed in the downward slope 7 of the recycle passage 12 is formed into the water droplets. If the inclination θ formed between the passage and the horizontal plane is 90 degrees, the entire circumferential inner portion of the pipe may get wet. However, in the case where the passage is inclined such that the inclination θ formed between the passage and the horizontal plane is less than 90 degrees, the water droplets move to a lower region inside the pipe, and a part of the inner portion of the pipe may get wet. Because of this, a situation in which the water droplets adhere onto the wall surface of the inner portion of the pipe and are formed into a liquid film is less likely to occur. In other words, since the contact area of a gas-liquid interface is less likely to increase, re-evaporation of the water droplets generated by condensation can be prevented. Since the recycle passage 12 having the downward slope 7 allows the water droplets generated by condensation to be guided to the water drain passage more smoothly than the recycle passage which does not have the downward slope, the clogging of the recycle passage 12 can be avoided more effectively.

For example, the downward slope 7 of the recycle passage 12 may be designed to have a pipe diameter which does not cause formation of a water film due to a surface tension, in order to prevent the interior of the pipe from getting fully clogged with the water condensed within the pipe. The pipe diameter of the downward slope 7 may be set to, for example, not less than 3 mm and not more than 20 mm. The pipe may be configured to have an angle having a sufficient allowance with respect to the sliding angle of the water which is determined by the state of the inner surface of the pipe, the material of the pipe, and the viscosity of the water so that the water is discharged only by a gravitational force exerted on the condensed water droplets. The pipe may be configured to have an inner diameter which causes a gas velocity to be equal to or lower than 0.3 m/sec. Or, the pipe may be configured such that the angle formed between the downward slope and the horizontal plane is not less than 10 degrees and less than 90 degrees.

Embodiment 2

A hydrogen generator of Embodiment 2 is the hydrogen generator of Embodiment 1, and is configured such that the downward slope of the recycle passage includes a first passage sloping downward, and a second passage which is connected to the first passage and inclined at an obtuse angle with respect to the first passage.

In this configuration, since a bent portion formed between the first passage and the second passage has the obtuse angle, turbulent flow of the gas is less likely to occur in the bent portion. Therefore, the condensed water does not convect and easily moves downward. This allows the condensed water to be discharged from the recycle passage more efficiently than in a case where the bent portion is formed to have an acute angle.

The obtuse angle refers to an angle which is larger than 90 degrees and smaller than 180 degrees (hereinafter the same applies to other embodiments). The phrase "inclined at an obtuse angle with respect to the first passage" means that the angle formed between the first passage and the second passage is the obtuse angle.

Figure 2:
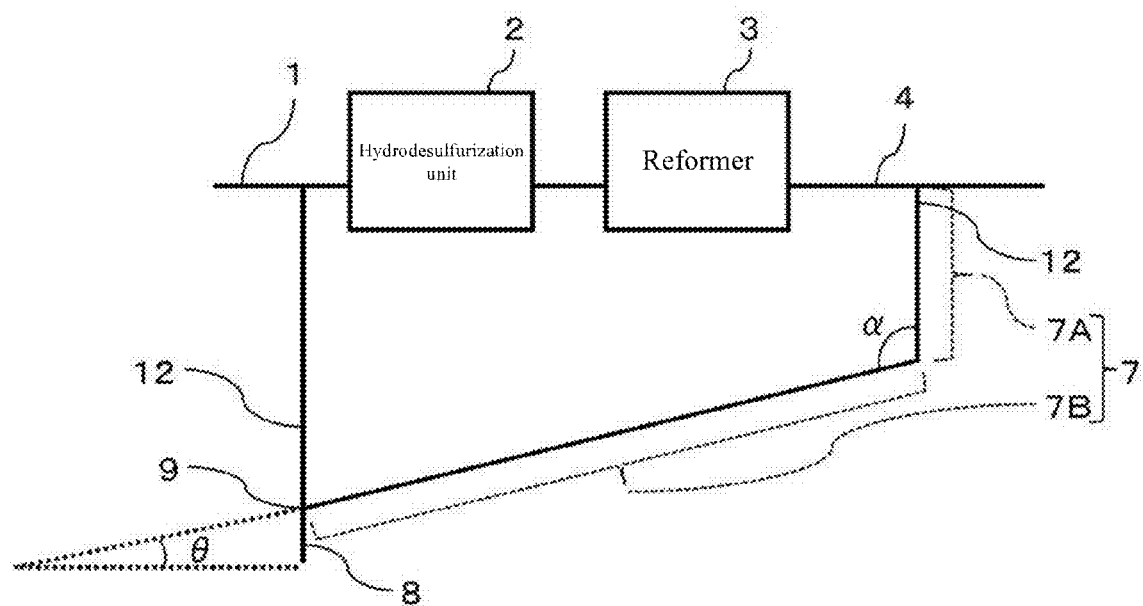
FIG. 2 is a view showing the exemplary schematic configuration of a hydrogen generator according to Embodiment 2.

FIG. 2 is a view showing the exemplary schematic configuration of the hydrogen generator according to Embodiment 2.

The configuration of a hydrogen generator 200 of the present embodiment may be similar to that of the hydrogen generator 100 of Embodiment 1 except for the configuration of the recycle passage 12. Therefore, the components which are common in FIGS. 1 and 2 are designated by the same reference symbols and names and will not be described in detail repeatedly.

In the hydrogen generator 200 of the present embodiment, the downward slope of the recycle passage includes a first passage 7A extending vertically downward, and a second passage 7B which is connected to the first passage 7A and inclined at an obtuse angle α with respect to the first passage 7A.

The inclination θ formed between the second passage 7B and the horizontal plane may be set to, for example, not less than 5 degrees and not more than 90 degrees. The inclination θ formed between the second passage 7B and the horizontal plane is desirably set to not less than 10 degrees and not more than 90 degrees. The inclination θ formed between the second passage 7B and the horizontal plane is desirably set to not less than 15 degrees and not more than 90 degrees. By setting an appropriate inclination angle, the condensed water easily moves downward within the second passage 7B such that the condensed water does not get stagnant therein.

The second passage 7B may have a downstream portion extending horizontally. The water drain passage 8 may be provided in the downstream portion extending horizontally in the second passage 7B.

In the present embodiment, the hydrogen-containing gas discharged from the reformer 3 contains the steam, and is formed into condensed water while the hydrogen-containing gas is flowing through the recycle passage 12. The water droplets generated by condensation slide down on the downward slope 7 and are guided to the water drain passage 8.

In the upstream portion of the downward slope 7 of the recycle passage 12 which portion is relatively close in distance to the reformer 3, a saturated steam pressure is high and a plenty of condensed water is generated. Therefore, the passage is likely to get clogged with the condensed water. As used herein, the distance refers to the length of a path over which the gas flows, and for example, a pipe length in a case where the recycle passage 12 is formed of a pipe. Since the upstream portion of the downward slope 7 of the recycle passage 12 includes the first passage 7A extending vertically downward, the water droplets are allowed to move downward efficiently by a gravitational force.

The downstream portion of the downward slope 7 of the recycle passage 12 which portion is relatively distant from the reformer 3 is configured to have a gentle slope to allow the water droplets to be grown into larger ones. Therefore, it becomes possible to suppress the water droplets generated in the downward slope 7 from moving to a downstream side of the recycle passage 12 along with the flow of the recycle gas, beyond the branch point at which the water drain passage 8 branches from the downward slope 7, and to smoothly guide the water droplets generated in the downward slope 7 to the water drain passage 8.

The inclination formed between the first passage 7A and the horizontal plane may not be necessarily 90 degrees. For example, the inclination may be larger than 0 and smaller than 90 degrees.

Although in the example of FIG. 2, the angle formed between the hydrogen-containing gas passage 4 and the first passage 7A is 90 degrees, this angle may be an obtuse angle.

The inclination formed between the downward slope 7 of the recycle passage 12 and the horizontal plane may decrease as the distance from the reformer 3 increases. The bent portion which is discontinuous is not essential. The inclination formed between the downward slope 7 of the recycle passage 12 and the horizontal plane may decrease continuously as the distance from the reformer 3 increases. Specifically, for example, at least a part of the recycle passage may be formed to have a spiral shape. In this configuration, also, in the upstream portion of the downward slope 7, the water droplets are allowed to move downward efficiently by the gravitational force. In the downstream portion of the downward slope 7, the water droplets are grown into larger ones, and thus the condensed water generated in the downward slope 7 can be guided smoothly to the water drain passage 8.

A part of the downward slope 7 may extend horizontally. In this case, the water drain passage 8 may be provided in the horizontally extending portion of the downward slope 7. A part or entire of the downward slope 7 may be a part of a U-shaped pipe.

Embodiment 3

A hydrogen generator of Embodiment 3 is the hydrogen generator of one of Embodiment 1 and Embodiment 2, and is configured such that the recycle passage includes a downward slope and an upward slope in this order from an upstream side.

In this configuration, the branch point of the water drain passage is placed in a higher position, and the recycle passage can be reduced in size in a vertical direction.

In the hydrogen generator of Embodiment 3, the upward slope of the recycle passage includes a third passage which is connected to the second passage and inclined at an obtuse angle with respect to the second passage, and a fourth passage which is connected to the third passage, is inclined at an obtuse angle with respect to the third passage, and slopes upward.

In this configuration, since bent portions formed by the third passage and the fourth passage have the obtuse angles, respectively, turbulent flow of the gas is less likely to occur in the bent portions. Therefore, the condensed water does not convect and easily moves downward smoothly. This allows the condensed water to be discharged from the recycle passage more efficiently than in a case where the bent portions are formed to have acute angles, respectively.

By setting all of the angles formed by the bent portions of the recycle passage to the obtuse angles, respectively, the turbulent flow of the gas is less likely to occur in the bent portions than in the above case. Therefore, the condensed water can be discharged more efficiently from the recycle passage.

In the above hydrogen generator, the water drain passage may branch from the recycle passage at a location of a connecting portion of the second passage and of the third passage.

In this configuration, since the water drain passage is connected to the lowermost portion of the recycle passage, it becomes possible to suppress the condensed water from getting stagnant inside the passage and to smoothly guide the condensed water to the water drain passage 8.

Figure 3:
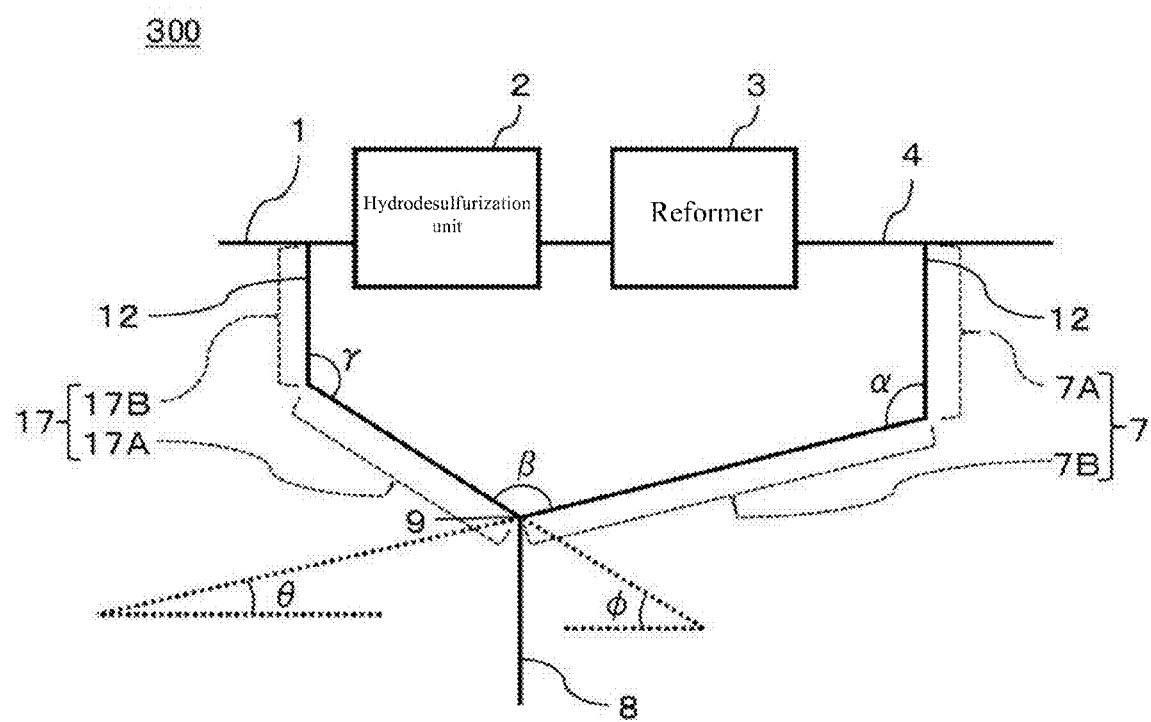
FIG. 3 is a view showing the exemplary schematic configuration of a hydrogen generator according to Embodiment 3.

FIG. 3 is a view showing the exemplary schematic configuration of the hydrogen generator according to Embodiment 3.

The configuration of a hydrogen generator 300 of the present embodiment may be similar to that of the hydrogen generator 100 of Embodiment 1 except for the configuration of the recycle passage 12. Therefore, the components which are common in FIGS. 1 and 3 are designated by the same reference symbols and names and will not be described in detail repeatedly.

In the hydrogen generator 300 of the present embodiment, the downward slope 7 of the recycle passage includes a first passage 7A extending vertically downward, and a second passage 7B which is connected to the first passage 7A and inclined at an obtuse angle α with respect to the first passage 7A.

In the hydrogen generator 300 of the present embodiment, an upward slope 17 of the recycle passage includes a third passage 17A which is connected to the second passage 7B and inclined at an obtuse angle β with respect to the second passage 7B, and a fourth passage 17B which is connected to the third passage 17A, is inclined at an obtuse angle γ with respect to the third passage 17A, and extends vertically upward.

The inclination θ formed between the second passage 7B and the horizontal plane may be set to not less than 5 degrees and not more than 90 degrees. The inclination θ formed between the second passage 7B and the horizontal plane is desirably set to not less than 10 degrees and not more than 90 degrees. The inclination θ formed between the second passage 7B and the horizontal plane is desirably set to not less than 15 degrees and not more than 90 degrees. By setting an appropriate slope angle, the condensed water easily moves downward within the second passage 7B such that the condensed water does not get stagnant therein.

The inclination φ formed between the third passage 17A and the horizontal plane may be set to not less than 5 degrees and not more than 90 degrees. The inclination φ formed between the third passage 17A and the horizontal plane is desirably set to not less than 10 degrees and not more than 90 degrees. The inclination φ formed between the third passage 17A and the horizontal plane is desirably set to not less than 15 degrees and not more than 90 degrees. By setting an appropriate slope angle, the condensed water easily moves downward within the third passage 17A such that the condensed water does not get stagnant therein.

The inclination θ formed between the second passage 7B and the horizontal plane and the inclination φ formed between the third passage 17A and the horizontal plane may satisfy a relationship of θ<φ. In the third passage 17A having the upward slope, the flow direction of the gas and the direction in which the water droplets move downward are opposite to each other, differently from those in the second passage 7B having the downward slope. Therefore, in the third passage 17A having the upward slope, the water droplets do not easily move downward due to a drag generated by the gas flow. By setting the inclination φ formed between the third passage 17A and the horizontal plane larger than the inclination θ formed between the second passage 7B and the horizontal plane, the water droplets are allowed to easily move downward within the third passage 17A.

The hydrogen-containing gas flowing through the recycle passage 12 contains a plenty of steam in its upstream side. To discharge the water droplets, firstly, the hydrogen-containing gas flows through the downward slope 7. The water droplets sliding down on the downward slope 7 reach the branch point at which the water drain passage 8 branches from the downward slope 7, move vertically downward by a gravitational force, and is introduced into the water drain passage 8. In contrast, the hydrogen-containing gas which has passed through the branch point at which the water drain passage 8 branches from the recycle passage, still contains the steam, which is formed into the water droplets within the recycle passage. To guide to the water drain passage 8 the water droplets generated by the condensation, after the hydrogen-containing gas has passed through the branch point, the upward slope 17 is provided. In this configuration, the branch point is a lowermost portion in a portion of the recycle passage, through which portion the hydrogen-containing gas containing the steam flows. By placing the water drain passage 8 at this location, it becomes possible to suppress the condensed water from getting stagnant inside the recycle passage and to smoothly introduce the condensed water into the water drain passage 8.

The entire recycle passage 12 may be composed of the upward slope 17 and the downward slope 7. Or, a part of the recycle passage 12 may be composed of the upward slope 17 and the downward slope 7.

A part or entire of the upward slope 17 may be a part of a U-shaped pipe. The U-shaped pipe may be composed of a part or entire of the upward slope 17, and a part or entire of the downward slope 7.

At least a part of the downward slope 7 and the upward slope 12 may be provided in the intermediate portion of a ventilation path within a system casing accommodating the reformer, the fuel cell and others so that this part is cooled by a ventilation air flow. At least one of the downward slope 7 and the upward slope 12 is desirably provided on the ventilation path connecting an air inlet and an air outlet to each other within the system casing, because the slope provided in the ventilation path is cooled more efficiently, and the discharge efficiency of the condensed water is improved.

Figure 4:
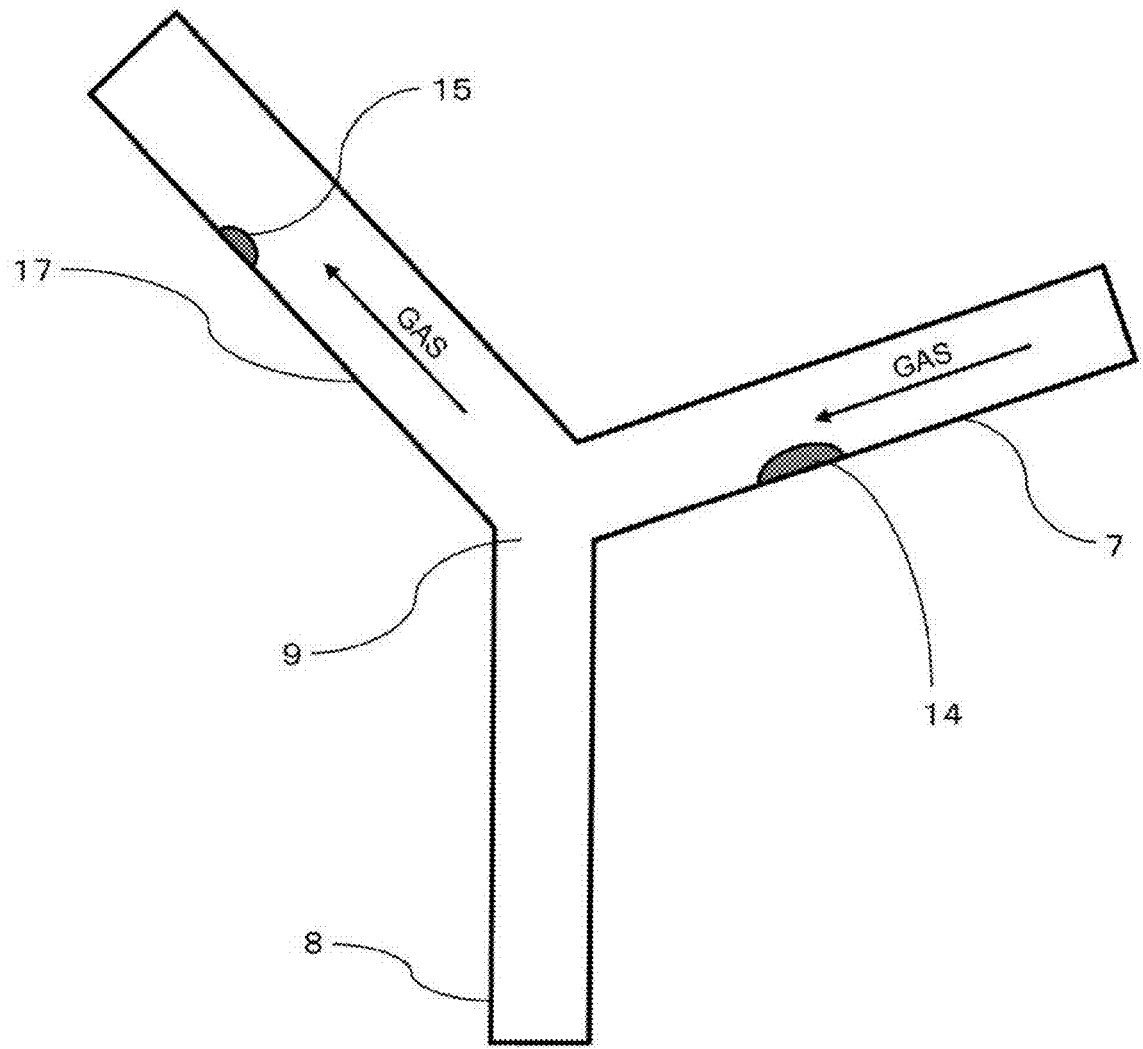
FIG. 4 is a cross-sectional view showing the exemplary schematic configuration of a region in the vicinity of a water drain passage in the hydrogen generator according to Embodiment 3.

FIG. 4 is a cross-sectional view showing the exemplary schematic configuration of a region in the vicinity of the water drain passage in the hydrogen generator according to Embodiment 3.

In the example of FIG. 4, water droplets 14 generated by condensation in the downward slope 7 are guided to the water drain passage 8 via the branch point at which the water drain passage 8 branches from the recycle passage. After that, the recycle gas travels through the upward slope 17. Since the water droplets generated by condensation in the downward slope 7 have been removed from the recycle gas, a steam pressure of the recycle gas has been lowered, but the recycle gas still contains the steam. Therefore, condensation occurs and condensed water 15 is generated inside the upward slope 17.

Due to the flow of the recycle gas, the condensed water 15 inside the upward slope 17 is subjected to a drag applied in the direction that is opposite to the direction of the force causing the condensed water 15 to slide down by the gravitational force. This drag impedes the downward movement of the condensed water 15, which may increase a possibility that the passage gets clogged with the condensed water.

The inner diameter of the pipe constituting the upward slope 17 may be increased so that the flow velocity of the recycle gas flowing through the upward slope 17 decreases to the flow velocity at which the condensed water are allowed to move downward in the upward slope 17. For example, the inner diameter of the pipe constituting the upward slope 17 may be set so that the gas flow velocity is higher than 0 m/sec and equal to or lower than 1 m/sec. The inner diameter of the pipe constituting the upward slope 17 is desirably set so that the gas flow velocity is higher than 0 m/sec and equal to or lower than 0.6 m/sec. The inner diameter of the pipe constituting the upward slope 17 is desirably set so that the gas flow velocity is higher than 0 m/sec and equal to or lower than 0.3 m/sec. Note that the above gas flow velocity is a gas flow velocity corresponding to a maximum amount of hydrogen generated in the hydrogen generator 100.

The inclination angle of the upward slope 17 may be set so that the force causing the condensed water to slide down within the upward slope 17 is increased to a magnitude which allows the condensed water to move downward against the flow of the recycle gas. For example, the inclination $\phi$ formed between the upward slope 17 and the horizontal plane may be set to not less than 15 degrees and not more than 90 degrees.

In this configuration, the gravitational force applied to the condensed water 15 is allowed to work effectively against the drag applied to the condensed water 15 due to the gas flow. This can increase a possibility that the condensed water 15 generated inside the upward slope 17 is guided smoothly to the water drain passage 8.

After the water droplets generated in the upward slope 17 are discharged, the recycle gas flows from the downstream end of the third passage 17A to the fourth passage 17B extending vertically upward. The steam pressure of the recycle gas in the fourth passage 17B has been lowered because the condensed water has been generated. Because of this, in the fourth passage 17B, a uniform liquid film is less likely to be formed on the inner wall surface of the passage, and the condensed water is formed by fine particles of minute water droplets in the gas. In view of this, instead of providing a slope for causing the water droplets to slide down on the wall surface of the passage, the fourth passage 17B may be disposed to extend vertically upward so that the fine particles of the water droplets generated in the gas fall down though inside the passage without making a contact with the wall surface of the passage.

The connecting portion of the upward slope 17 and of the downward slope 7 is the lowermost portion of the recycle passage. The water drain passage 8 is connected to the location of the connecting portion.

Embodiment 4

A hydrogen generator of Embodiment 4 is the hydrogen generator of any one of Embodiment 1, Embodiment 2, and Embodiment 3, and is configured such that the downstream end of the water drain passage is sealed by water.

In this configuration, since the water drain passage is sealed by the water, it becomes possible to reduce a possibility that the hydrogen-containing gas leaks to outside via the water drain passage and contacts outside air. Since the possibility that the hydrogen-containing gas leaks to outside the recycle gas passage is reduced, the hydrogen-containing gas can be supplied to the hydrodesulfurization unit more stably.

The phrase "the downstream end of the water drain passage is sealed by the water" includes both of a case where the downstream end of the water drain passage is directly sealed by the water and a case where the downstream end of the water drain passage is indirectly sealed by the water. The case where the downstream end of the water drain passage is indirectly sealed by the water is, for example, a case where the downstream end of the water drain passage is sealed with a tightly closed space interposed between the water and the downstream end of the water drain passage, etc.

Figure 5:
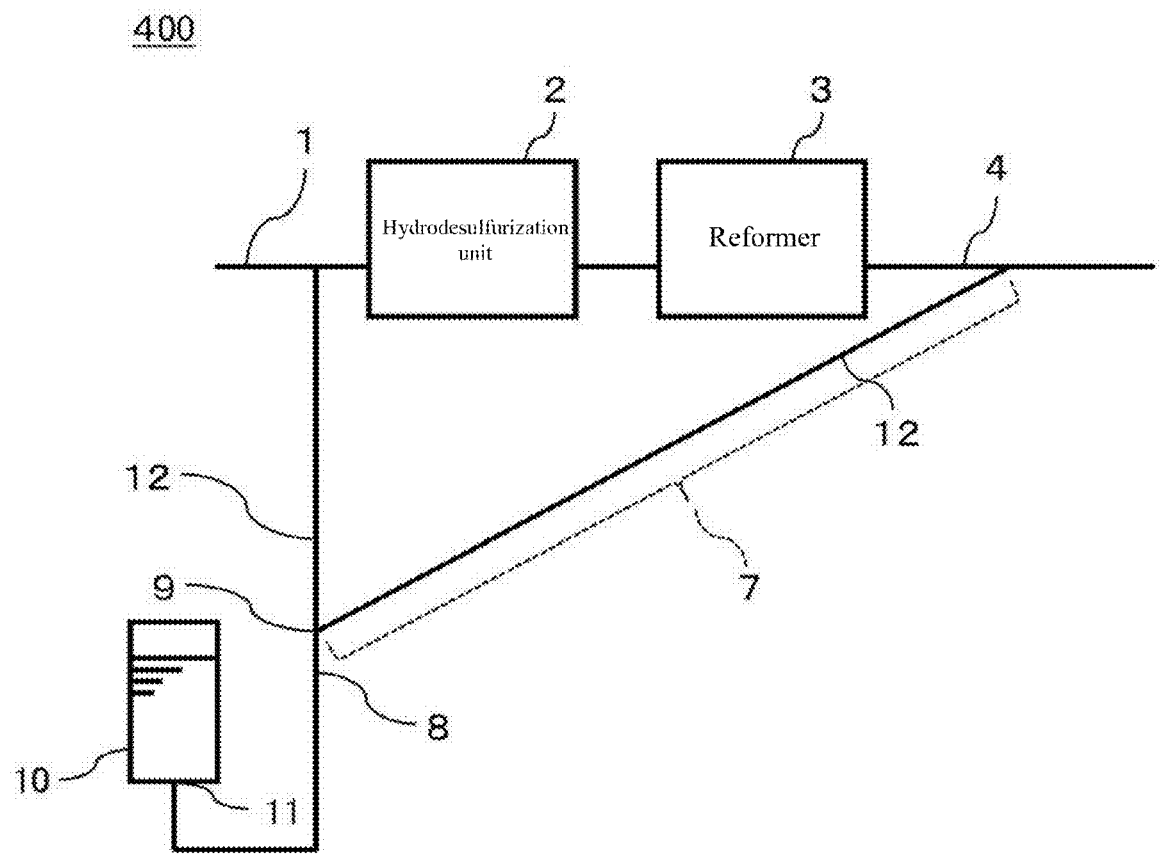
FIG. 5 is a view showing the exemplary schematic configuration of a hydrogen generator according to Embodiment 4.

FIG. 5 is a view showing the exemplary schematic configuration of the hydrogen generator according to Embodiment 4.

The configuration of a hydrogen generator 400 of the present embodiment may be similar to that of the hydrogen generator 100 of Embodiment 1 except that the water drain passage 8 is sealed by the water. Therefore, the components which are common in FIGS. 1 and 5 are designated by the same reference symbols and names and will not be described in detail repeatedly.

Figure 6:
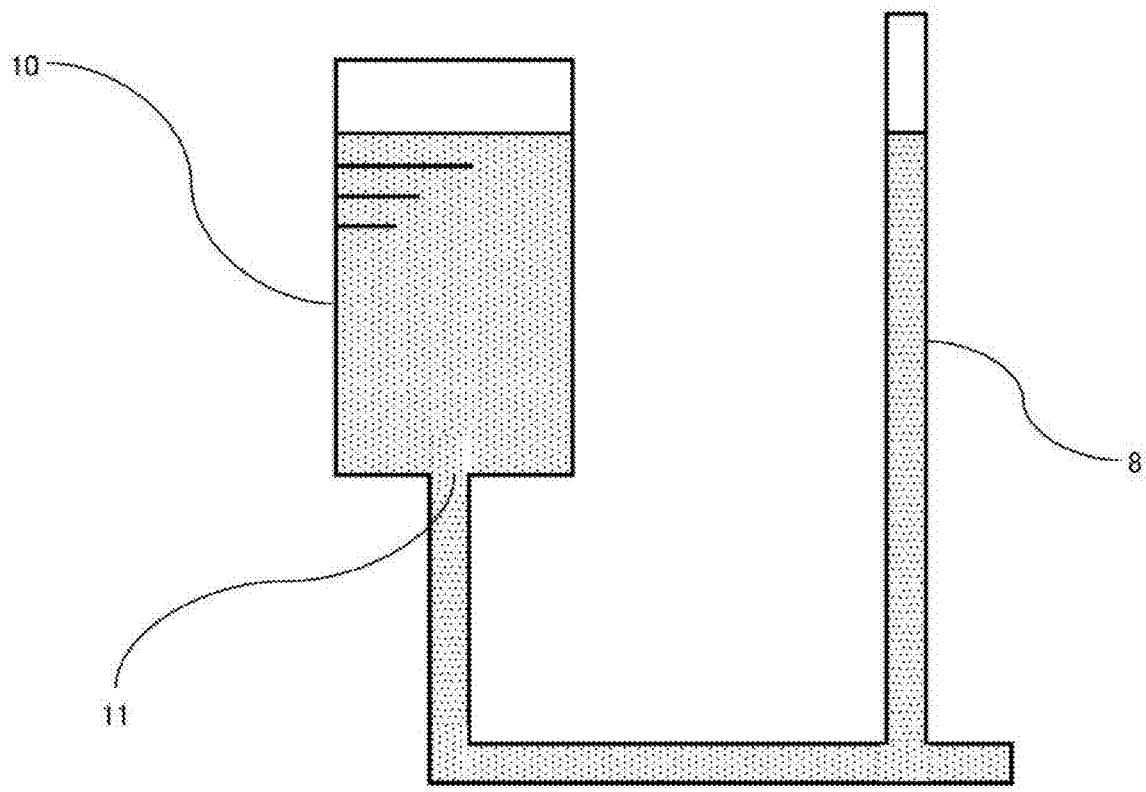
FIG. 6 is a cross-sectional view showing the exemplary schematic configuration of a region in the vicinity of a tank in the hydrogen generator according to Embodiment 4.

FIG. 6 is a cross-sectional view showing the exemplary schematic configuration of a region in the vicinity of a tank in the hydrogen generator according to Embodiment 4. In the example of FIGS. 5 and 6, a water tank 10 is connected to the water drain passage 8, and the water drain passage 8 is connected to the water tank 10 at a location below the water level of the water tank 10. In this way, the water drain passage 8 is seated by the water.

A tank for storing other water may also be used as the water tank 10. For example, a tank for storing water recovered from an exhaust gas of a fuel cell, a tank for storing cooling water used to cool the fuel cell, etc., may also be used as the water tank 10. The tank may be provided with a water drain port (not shown). In this case, for example, the water drain port may be an overflow port from which overflowing water is discharged from the tank. Or, the tank may be provided with a water drain port at a location below the water level of the tank, and a valve provided in a water drain passage (not shown) connected to the water drain port may be suitably opened to discharge the water.

The configuration of a water seal unit or a water seal means is not limited to the water tank 10, and may be another configuration. For example, the downstream end of the water drain passage 8 may be sealed by the water using a U-shaped pipe. The above case is an example of the case where the downstream end of the water drain passage 8 is directly sealed by the water.

In contrast, as an example of the case where the downstream end of the water drain passage 8 is indirectly sealed by the water, a tank for storing the water discharged from the downstream end of the water drain passage 8 is provided below the water drain passage 8 and the downstream end of the water drain passage 8 is positioned above the water level of the tank.

Embodiment 5

A fuel cell system of Embodiment 5 includes the hydrogen generator of any one of Embodiment 1, Embodiment 2, Embodiment 3, and Embodiment 4, and a fuel cell configured to generate electric power using the hydrogen-containing gas supplied from the hydrogen generator.

In this configuration, without providing a condenser separately, the condensed water can be generated in the recycle passage and can be discharged from the water drain passage. As a result, it becomes possible to provide a fuel cell system which is simpler in configuration and lower in cost than in a conventional example.

Figure 7:
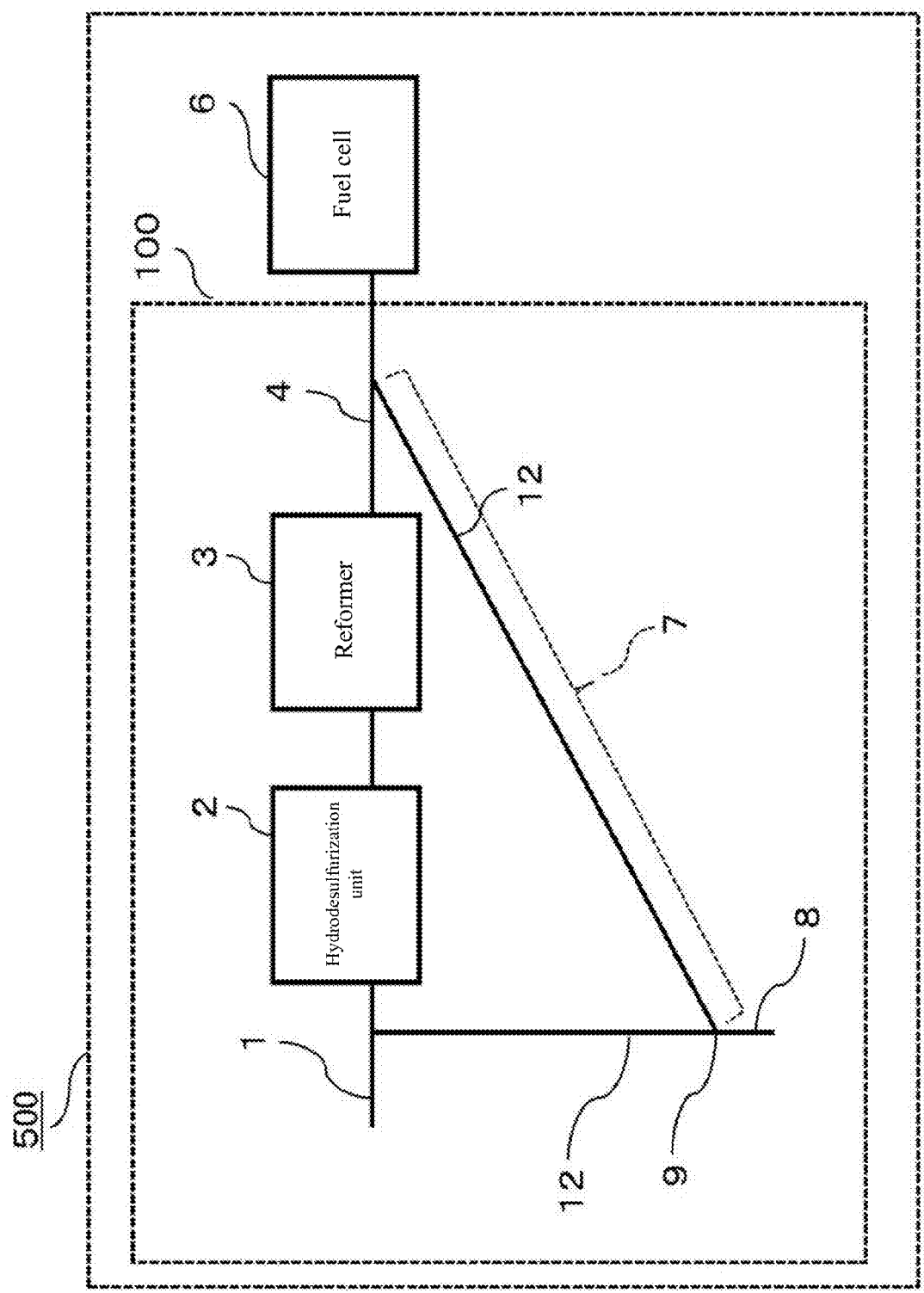
FIG. 7 is a conceptual view showing the exemplary schematic configuration of a fuel cell system according to Embodiment 5.

FIG. 7 is a conceptual view showing the exemplary schematic configuration of the fuel cell system according to Embodiment 5.

In the example of FIG. 7, a fuel cell system 500 of the present embodiment includes the hydrogen generator 100 of Embodiment 1, and a fuel cell 6. The configuration of the hydrogen generator 100 may be similar to that of the hydrogen generator 100 of Embodiment 1. Therefore, the components which are common in FIGS. 1 and 7 are designated by the same reference symbols and names and will not be described in detail repeatedly. The hydrogen generator may be the hydrogen generator of any one of Embodiment 1, Embodiment 2, Embodiment 3, Embodiment 4, and modified examples thereof.

The fuel cell 6 generates the electric power using the hydrogen-containing gas supplied from the hydrogen generator. The fuel cell may be of any kind. For example, the fuel cell may be a polymer electrolyte fuel cell, a solid oxide fuel cell, a phosphoric acid fuel cell, etc. In a case where the fuel cell 6 is the solid oxide fuel cell, the reformer 3 within the hydrogen generator 100 and the fuel cell 6 are built into one container.

Embodiment 6

A fuel cell system of Embodiment 6 is configured such that the fuel cell system of Embodiment 5 includes a water tank configured to store water generated from the exhaust gas discharged from the fuel cell system, and the water drain passage is connected to the water tank at a location below the water level of the water tank.

In this configuration, the water seal of the water drain passage is realized by utilizing the water tank which is typically included in the fuel cell system. Therefore, the configuration may be simpler than in a case where the water tank is not utilized for the water seal.

The exhaust gas discharged from the fuel cell system may be at least one of, for example, an off-oxidizing-gas discharged from the fuel cell, an off-fuel-gas discharged from the fuel cell, and a combustion exhaust gas generated by combusting the off-fuel-gas discharged from the fuel cell.

Figure 8:
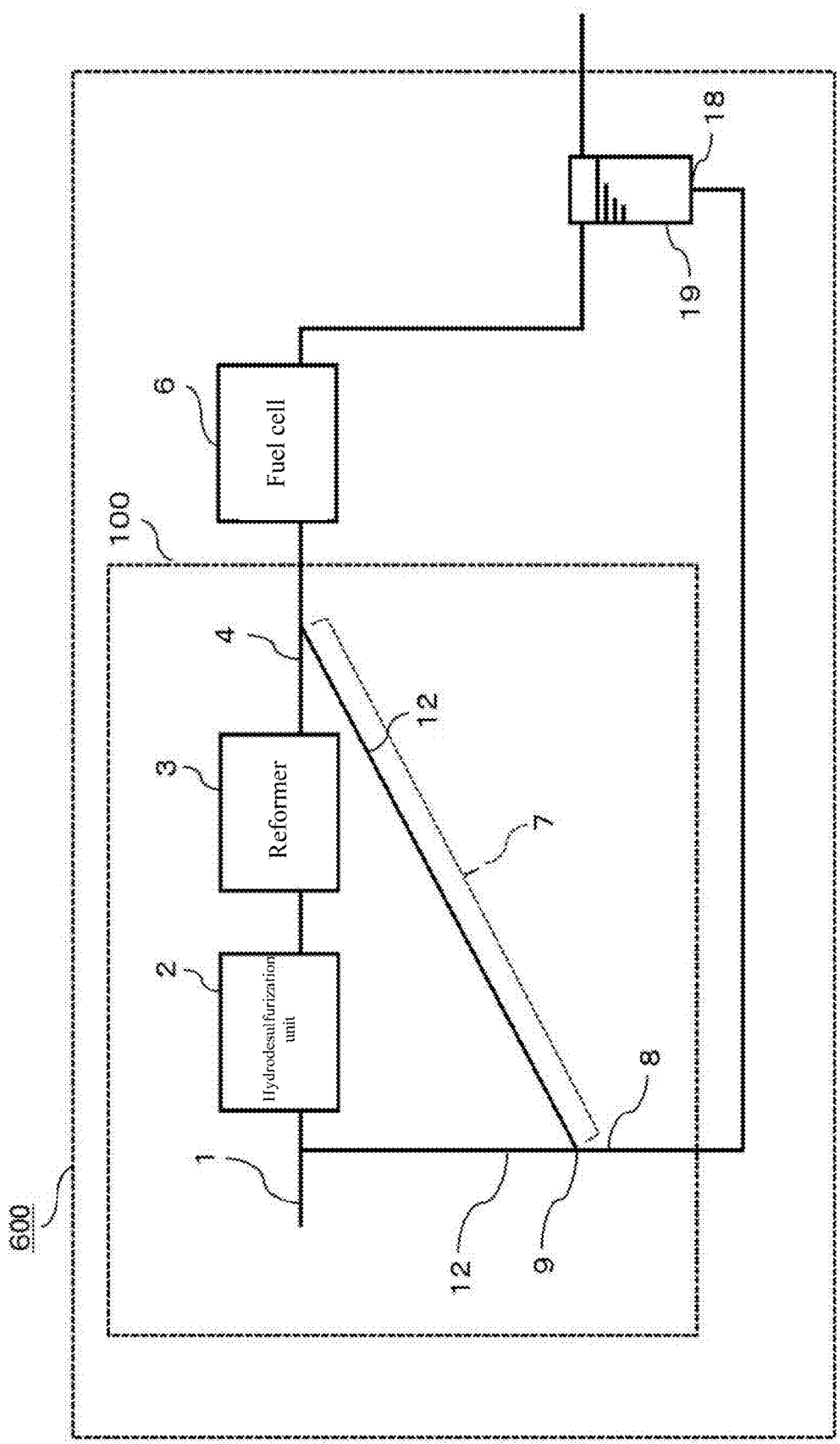
FIG. 8 is a conceptual view showing the exemplary schematic configuration of a fuel cell system according to Embodiment 6.

FIG. 8 is a conceptual view showing the exemplary schematic configuration of the fuel cell system according to Embodiment 6.

In the example of FIG. 8, a fuel cell system 600 includes the hydrogen generator 100 of Embodiment 1, the fuel cell 6, and a water tank 19. The configuration of the hydrogen generator 100 may be similar to that of the hydrogen generator 100 of Embodiment 1. Therefore, the components which are common in FIGS. 1 and 8 are designated by the same reference symbols and names and will not be described in detail repeatedly. The hydrogen generator may be the hydrogen generator of any one of Embodiment 1, Embodiment 2, Embodiment 3, Embodiment 4, and modified examples thereof.

The fuel cell 6 may be similar to that of the fuel cell 6 of Embodiment 5 and will not be described in detail repeatedly.

The water tank 19 stores the water in the exhaust gas discharged from the fuel cell system 600. In the example of FIG. 8, the water tank 19 is the water tank which stores the water in the off-fuel-gas discharged from the fuel cell 6. Although in the example of FIG. 8, the off-fuel-gas discharged from the water tank 19 is discharged to outside the fuel cell system 600, for example, the off-fuel-gas may be supplied to a combustor (not shown), and combusted therein.

Although in the example of FIG. 8, the water drain passage 8 is connected to the bottom of the water tank 19, the present embodiment is not limited to this example. The water drain passage 8 may be connected to the water tank 19 at any location so long as the location is below the water level of the water tank 19. Specifically, the water drain passage 8 may be connected to the side surface of the water tank 19.

The lower end portion of the water drain passage 8 configured as described above is sealed by the water all the time. This water seal structure allows the hydrogen-containing gas which has passed through the downward slope 7 to smoothly flow into a region of the recycle passage 12 which region is downstream of the branch point 9 without flowing into the water drain passage 8. Therefore, it becomes possible to reduce a possibility that the hydrogen-containing gas leaks to outside via the water drain passage 8 and contacts the outside air. In addition, the hydrogen-containing gas can be stably supplied to the hydrodesulfurization unit.

In a case where the fuel cell system 600 is operated continuously, the condensed water is accumulated in the water drain passage 8. Therefore, it is necessary to discharge the condensed water on a regular basis. If the water drain passage 8 is provided with a valve and the like to discharge the water only from the water drain passage 8, then a pressure within the recycle pipe may change and the flow rate of the recycle gas may change, due to a change in the water level. In the configuration of the present embodiment, the water drain passage 8 and the water tank 19 are in communication with each other and the water is discharged from both of the water drain passage 8 and the water tank 19. Therefore, it becomes possible to suppress a change in the water level of the water drain passage 8 as compared to a case where the water is discharged only from the water drain passage 8. This makes it possible to suppress a pressure change within the recycle passage 12, and to stably supply the hydrogen-containing gas to the hydrodesulfurization unit.

Embodiment 7

A fuel cell system of the present embodiment is configured such that the fuel cell system of Embodiment 6 includes an on-off valve provided in the recycle passage, and a control unit configured to open the on-off valve after filling of the water into the water tank is performed such that the water level of the water tank becomes above the location of the connecting portion of the water drain passage and of the water tank.

In this configuration, the hydrogen-containing gas flows through the recycle gas passage after the water seal of the water drain passage is accomplished. Therefore, it becomes possible to reduce a possibility that the hydrogen-containing gas leaks to outside via the water drain passage and contacts outside air. In addition, the hydrogen-containing gas can be stably supplied to the hydrodesulfurization unit.

Figure 9:
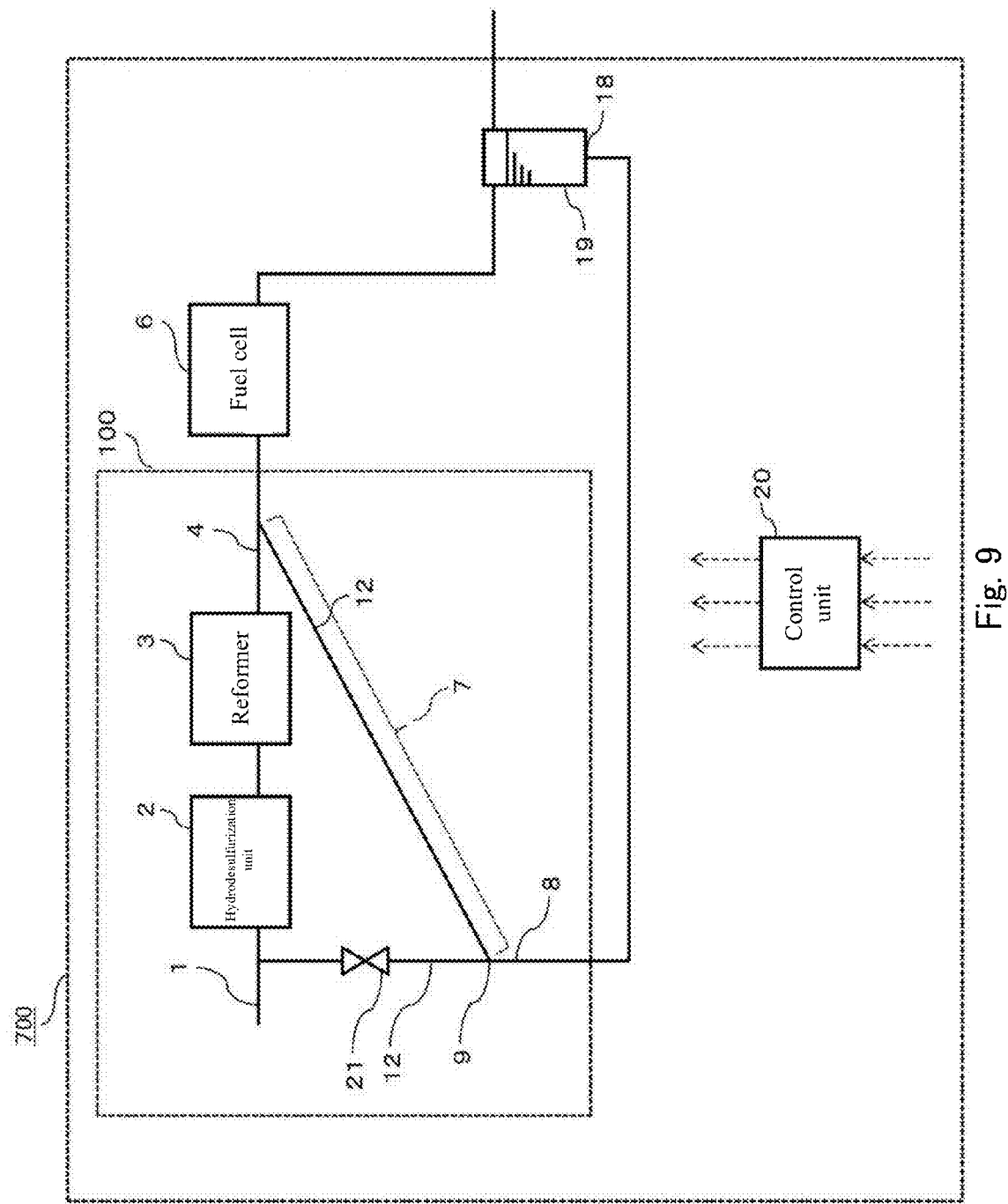
FIG. 9 is a conceptual view showing the exemplary schematic configuration of a fuel cell system according to Embodiment 7.

FIG. 9 is a conceptual view showing the exemplary schematic configuration of the fuel cell system according to Embodiment 7.

In the example of FIG. 9, a fuel cell system 700 includes the hydrogen generator 100, the fuel cell 6, the water tank 19, and a control unit 20. The configuration of the hydrogen generator 100 may be similar to that of the hydrogen generator 100 of Embodiment 1 except that the recycle passage 12 is provided with an on-off valve 21. Therefore, the components which are common in FIGS. 9 and 1 are designated by the same reference symbols and names and will not be described in detail repeatedly. The configuration of the hydrogen generator may be similar to that of the hydrogen generator of any one of Embodiment 1, Embodiment 2, Embodiment 3, Embodiment 4, and modified examples thereof except that the recycle passage 12 is provided with the on-off valve 21.

The fuel cell 6 may be similar to the fuel cell 6 of embodiment 5. The water tank 19 may be similar to the water tank 19 of Embodiment 6. The on-off valve 21 is an on-off valve provided in the recycle passage. The on-off valve 21 may be communicatively connected to the control unit 20.

The control unit 20 opens the on-off valve 21 after filling of the water into the water tank 19 is performed such that the water level of the water tank 19 becomes above the location of a connecting portion 18 of the water drain passage 8 and of the water tank 19. The control unit 20 may have any configuration so long as the control unit has a control function. For example, the control unit 20 may include a processor section (not shown), and a storage section (not shown) for storing control programs. As an example of the processor section, there are MPU, CPU, etc. As an example of the storage section, there is a memory. The control unit may be configured as a single control unit which performs centralized control or a plurality of control units which cooperate with each other to perform distributed control.

Figure 10:
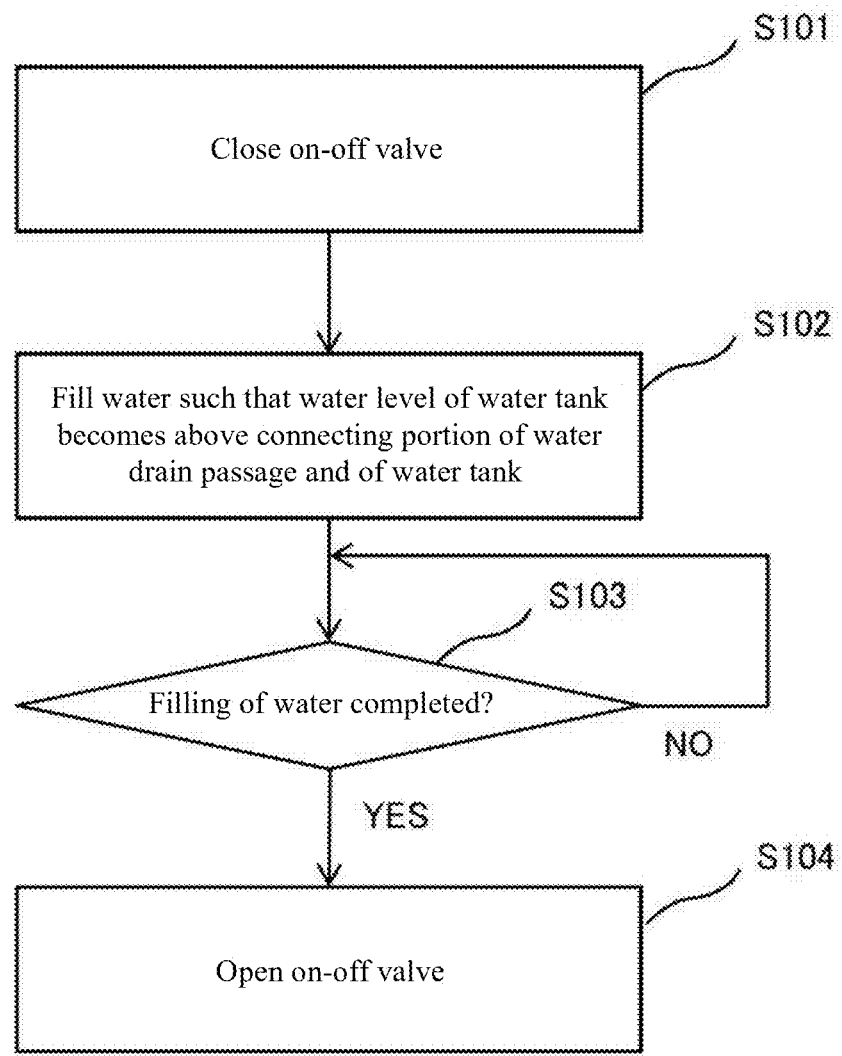
FIG. 10 is a flowchart showing the exemplary operation method of the fuel cell system according to Embodiment 7.

FIG. 10 is a flowchart showing the exemplary operation method of the fuel cell system according to Embodiment 7. The operation method may be executed under control of the control unit 20.

For example, at start-up, the control unit 20 closes the on-off valve 21 (step S101). In a case where the on-off valve 21 has already been closed before start-up, this step may be omitted.

Then, the control unit 20 performs filling of the water into the water tank 19 such that the water level of the water tank 19 becomes above the location of the connecting portion of the water drain passage 8 and of the water tank 19 (step S102). After filling of the water is completed (YES in step S103), the control unit 20 opens the on-off valve 21 at a predetermined timing (step S104). The predetermined timing is at least after the reformer 3 has started to generate the hydrogen-containing gas.

It is supposed that, for example, at start-up of the fuel cell system 700, the water is insufficient in the water tank 19 and the water drain passage 8, and the water seal is not accomplished. In such cases, if the on-off valve 21 is opened, the recycle gas may flow into the water drain passage 8 and the hydrogen-containing gas flowing into the hydrodesulfurization unit 2 may become insufficient. To avoid this, before opening the on-off valve 21 to flow the hydrogen-containing gas through the recycle passage 12, the water is filled into the water tank 19 to ensure the water seal structure, and then the on-off valve 21 is opened to flow the hydrogen-containing gas. By flowing the hydrogen-containing gas by such a procedure, it becomes possible to reduce a possibility that the hydrogen-containing gas leaks to outside via the water drain passage 8 and contacts outside air. In addition, the hydrogen-containing gas can be stably supplied to the hydrodesulfurization unit.

Numeral improvements and alternative embodiments of the present disclosure will be conceived by those skilled in the art in view of the foregoing description. Accordingly, the description is to be construed as illustrative only, and is provided for the purpose of teaching those skilled in the art the best mode of carrying out the present disclosure. The details of the structure and/or function may be varied substantially without departing from the spirit of the present disclosure.

INDUSTRIAL APPLICABILITY

An aspect of the present disclosure is useful as a hydrogen generator and a fuel cell system because a simpler configuration and lower cost can be provided than in a conventional example.

REFERENCE SIGNS LIST 1 raw material supply passage
2 hydrodesulfurization unit
3 reformer
4 hydrogen-containing gas passage
6 fuel cell
7 downward slope
7A first passage
7B second passage
8 water drain passage
9 branch point
10 tank
11 connecting portion
12 recycle passage
14 water droplets 15 water droplets
17 upward slope
17A third passage
17B fourth passage
18 connecting portion
19 water tank
20 control unit
21 on-off valve
100 hydrogen generator
200 hydrogen generator
300 hydrogen generator
400 hydrogen generator
500 fuel cell system
600 fuel cell system
700 fuel cell system

The invention claimed is:

1. A hydrogen generator comprising:
a reformer configured to generate a hydrogen-containing gas through a reforming reaction using a raw material;
a hydrogen-containing gas passage downstream of the reformer;
a hydrodesulfurization unit configured to remove a sulfur compound from the raw material;
a recycle passage configured to flow therethrough the hydrogen-containing gas to be added to the raw material in a state before the raw material flows into the hydrodesulfurization unit, the recycle passage having a downward slope such that at least a portion of the recycle passage is inclined with respect to the hydrogen-containing gas passage; and
a water drain passage configured to discharge condensed water generated in the downward slope of the recycle passage.

2. The hydrogen generator according to claim 1,
wherein the downward slope of the recycle passage includes a first passage sloping downward, and a second passage which is connected to the first passage and inclined at an obtuse angle with respect to the first passage;
wherein the first passage and the second passage are configured such that the hydrogen-containing gas flows therethrough in this order; and
wherein the first passage is inclined with respect to a horizontal plane at a greater angle than the second passage.

3. The hydrogen generator according to claim 1,
wherein the recycle passage includes the downward slope and an upward slope in this order from an upstream side, and is joined to a raw material supply passage through which the raw material is supplied to the hydrodesulfurization unit, in a position which is downstream of the upward slope.

4. The hydrogen generator according to claim 3,
wherein the upward slope of the recycle passage includes a third passage which is connected to the second passage and inclined at an obtuse angle with respect to the second passage, and a fourth passage which is connected to the third passage, is inclined at an obtuse angle with respect to the third passage, and slopes upward.

5. The hydrogen generator according to claim 4,
wherein the water drain passage branches from the recycle passage at a location of a connecting portion of the second passage and of the third passage.

6. The hydrogen generator according to claim 1,
wherein a downstream end of the water drain passage is sealed by water.

7. A fuel cell system comprising:
the hydrogen generator as recited in claim 1; and
a fuel cell configured to generate electric power using the hydrogen-containing gas supplied from the hydrogen generator.

8. The fuel cell system according to claim 7, comprising:
a water tank configured to store water generated from an exhaust gas discharged from the fuel cell system;
wherein the water drain passage is connected to the water tank at a location below a water level of the water tank.

9. The fuel cell system according to claim 8, comprising:
an on-off valve provided in the recycle passage; and
a control unit configured to open the on-off valve after filling of water into the water tank is performed such that the water level of the water tank becomes above the location of a connecting portion of the water drain passage and of the water tank.

10. The hydrogen generator according to claim 1, comprising:
a casing configured to accommodate the reformer;
wherein at least a part of the downward slope is cooled by a ventilation air flow for ventilating an interior of the casing.

11. The hydrogen generator according to claim 3, comprising:
a casing configured to accommodate the reformer;
wherein at least a part of the upward slope is cooled by a ventilation air flow for ventilating an interior of the casing.

* * * * *